(12) United States Patent
Tohta et al.

(10) Patent No.: US 7,476,178 B2
(45) Date of Patent: Jan. 13, 2009

(54) DEVICE AND METHOD FOR PREVENTING OVER-ROTATION OF ENGINES

(75) Inventors: Yuzuru Tohta, Yokohama (JP); Kenichiro Murakami, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 379 days.

(21) Appl. No.: 11/492,256

(22) Filed: Jul. 25, 2006

(65) Prior Publication Data

US 2007/0026997 A1 Feb. 1, 2007

(30) Foreign Application Priority Data

Jul. 26, 2005 (JP) ............................. 2005-215679
Jun. 19, 2006 (JP) ............................. 2006-168573

(51) Int. Cl.
*B60W 10/04* (2006.01)

(52) U.S. Cl. ..................................................... 477/107

(58) Field of Classification Search ........................ None
See application file for complete search history.

(56) References Cited

U.S. PATENT DOCUMENTS 7,125,363 B2 * 10/2006 Shim ........................... 477/107

2008/0009391 A1 * 1/2008 Scelers ........................ 477/107

FOREIGN PATENT DOCUMENTS

| DE | 199 63 678 A 1 | 8/2000 |
|---|---|---|
| EP | 1 413 724 A2 | 4/2004 |
| GB | 2 151 727 A | 7/1985 |
| JP | 2000-205399 A | 7/2000 |
| JP | 2004-245191 | 9/2004 |
| WO | 02/070923 A2 | 9/2002 |
| WO | WO 02/070923 A2 | 9/2002 |

* cited by examiner

*Primary Examiner*—Dirk Wright
(74) *Attorney, Agent, or Firm*—Young Basile

(57) ABSTRACT

A device and method that suppresses delay in response to gear-shifting in upshifting during control for preventing over-rotation. An engine torque control part controls the torque of the engine based on a driver request for driving force, a rotation velocity sensor detects the rotation velocity of the engine, and an over-rotation preventing part suppresses the controlled torque based on the velocity and prevents over-rotation of the engine. An over-rotation prevention releasing part releases suppression of the torque based on the rotation velocity lowered due to upshifting of the automatic transmission, and an engine torque increasing rate regulating part regulates the increasing rate of the torque when said suppression of the torque is released and the torque is increased.

18 Claims, 12 Drawing Sheets

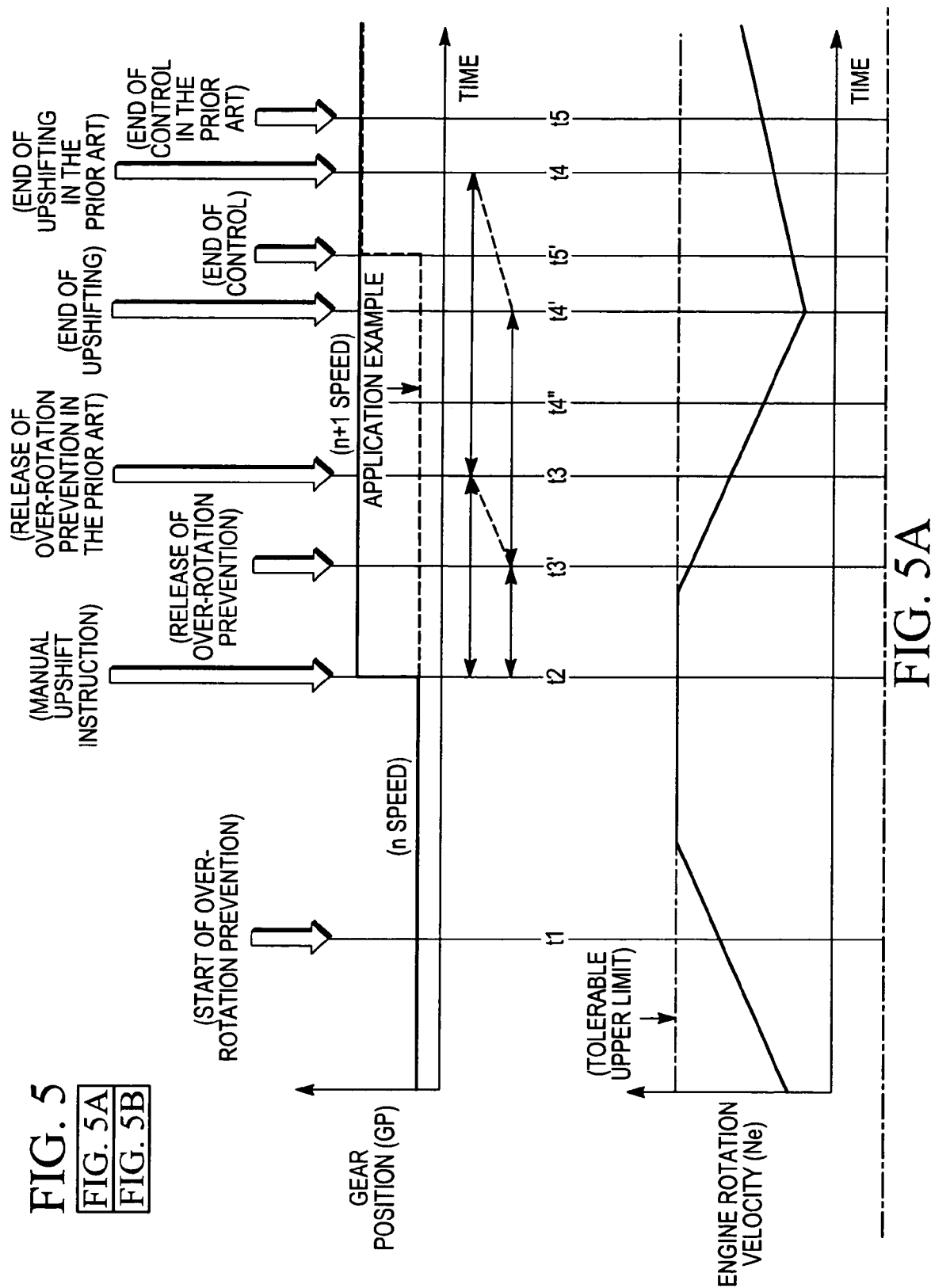

US 7,476,178 B2

DEVICE AND METHOD FOR PREVENTING OVER-ROTATION OF ENGINES

CROSS-REFERENCES TO RELATED APPLICATION

This application claims priority from Japanese Patent Application Serial No. 2005-215679, filed Jul. 26, 2005, and Serial No. 2006-168573, filed Jun. 19, 2006, each of which is incorporated herein by reference in its entirety.

TECHNICAL FIELD

The present invention pertains in general to a device and method for preventing over-rotation of an engine.

BACKGROUND

If an engine rotates at a velocity over the upper tolerance limit, the durability of the engine falls. This is an undesirable result. In order to prevent such a problem technology described in, for example, Japanese Kokai Patent Application No. 2004-245191 has been proposed. According to this technology, when over-rotation of the engine occurs due to ON/OFF control of the fuel supply, the catalyst of the engine exhaust system is adversely affected. This leads to deterioration in the operability of the engine. In consideration of this mechanism, over-rotation of the engine is prevented by reducing the opening degree of the throttle valve that controls the intake air flow rate of the engine.

BRIEF SUMMARY OF THE INVENTION

Embodiments of the invention can suppress a delay in response to the upshift of the gear-shifting operation of an automatic transmission during over rotation prevention.

For example, a device for preventing over-rotation of an engine with an automatic transmission is taught herein that comprises a rotation velocity sensor for detecting a rotation velocity of the engine and a controller receiving input from the rotation velocity sensor. The controller includes an engine torque control part operable to control a torque of the engine based on a driver request for driving force, an over rotation preventing part operable to suppress the torque controlled by the engine torque control part based on the rotation velocity and to prevent over rotation of the engine, an over rotation prevention releasing part operable to release suppression of the torque by the over rotation preventing part based on the rotation velocity lowered due to upshifting of the transmission, and an engine torque increasing rate regulating part operable to regulate an increasing rate of the torque when the suppression of the torque is released and the torque is increased due to the over rotation prevention releasing part.

In an over-rotation preventing device for preventing over rotation of an engine with an automatic transmission, an improvement described herein comprises means for decreasing a rotation velocity of the engine during control for preventing over rotation of the engine with engine torque suppressed, means for releasing the control for preventing over rotation when the rotation velocity of the engine falls with gear-shifting by the automatic transmission, means for increasing the engine torque after the control for preventing over-rotation is released and means for suppressing an engine torque increase recovery rate when the engine torque increases.

Embodiments of the invention also include methods for preventing over rotation of an engine that drives the driving wheels via an automatic transmission. One such method comprises controlling a torque of the engine based on a request by a driver for driving force, detecting a rotation velocity of the engine, suppressing the torque based on the rotation velocity, releasing suppression of the torque when the rotation velocity of the engine is lower than a prescribed level by gear-shifting the automatic transmission and regulating an increasing rate of the torque when suppression of the torque is released and the torque is increased.

BRIEF EXPLANATION OF DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
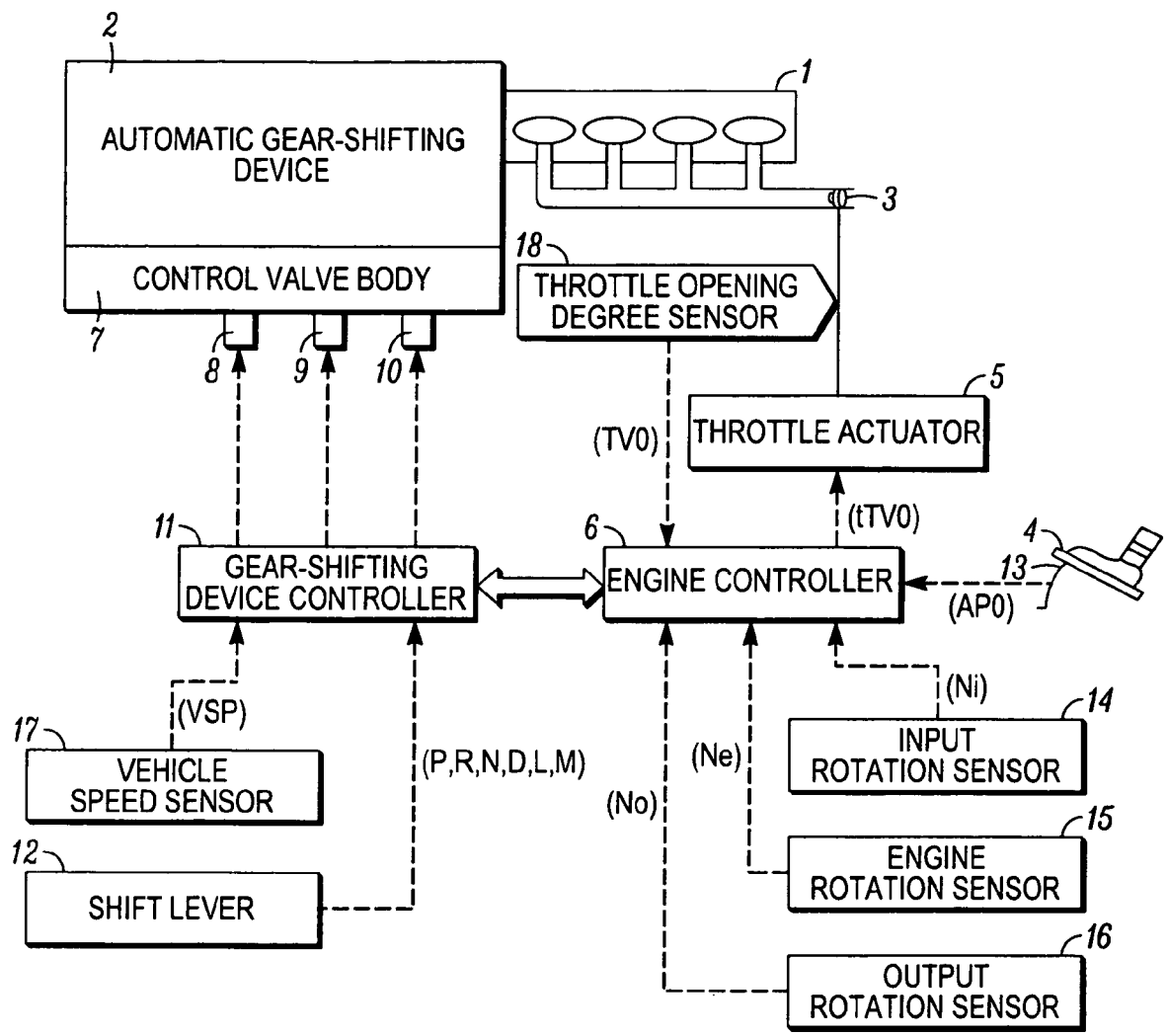
FIG. 1 is a system diagram illustrating a power train of a vehicle having a controller for preventing over-rotation of the engine according to one application example.

In the technology in which over-rotation of engine is prevented by reducing the opening degree of the throttle valve, such as Japanese Kokai Patent Application No. 2004-245191 mentioned above, several problems arise when upshifting takes place in the automatic transmission during control for preventing over-rotation. First, when the driver presses the accelerator pedal in driving the target engine torque tTe is set such that the torque becomes equal to the APO corresponding (driver requested) torque corresponding to the pressing distance (i.e., accelerator opening degree AP0). As engine rotation velocity Ne rises, and control is started to prevent over-rotation of the engine, target engine torque tTe is suppressed. That is, target engine torque tTe is set to be lower than the APO corresponding (driver request) torque.

Also, during the control for preventing over-rotation of the engine, when the automatic transmission receives an upshift instruction from gear position $GP=n^{th}$ speed to $GP=(n+1)^{th}$ speed, coupling pressure Po of the friction elements (clutch and brake) on the release side that should be released from the coupling state during the gear-shifting operation decreases. At the same time, coupling pressure Pc of the friction elements (clutch and brake) on the coupling side that should be coupled from the released state during the gear-shifting operation increases, and gear-shifting corresponding to the upshift instruction is executed.

In the process of upshifting, rotation velocity Ne of the engine falls, and, as a result, control for preventing over-rotation of the engine is released. Consequently, target engine torque tTe that has been suppressed for this control recovers to the APO corresponding (driver request) torque. When this torque is realized, the opening degree of the throttle valve recovers to the opening degree corresponding to accelerator opening degree AP0.

However, the recovery of target engine torque tTe that has been suppressed in order to prevent over-rotation is steep, and the rise of coupling pressure Pc of the friction elements on the coupling side that upshifts is much slower to recover target engine torque tTe. Due to the rise of coupling pressure Pc, the friction elements on the coupling side generate excessive slip during coupling, and the so-called flare phenomenon takes place. It takes a long time for the flare to converge. As a result, the gear-shifting time for the effective gear ratio, represented by the ratio of rotation velocity of the input shaft to that of the output shaft, to reach the gear ratio after gear-shifting increases. Gear-shifting response is delayed.

It is desirable to avoid a longer gear-shifting time (the time until the effective gear ratio represented by the ratio of the rotation velocity of the input shaft to that of the output shaft reaches the gear ratio after the gear-shifting), and it is desirable to prevent delay in the response of the gear-shifting operation. According to embodiments of the invention, an over-rotation-preventing device and method can suppress the delay in response of the gear-shifting operation. In the following, an explanation will be given in more detail regarding embodiments of the present invention with reference to application examples illustrated by figures.

FIG. 1 shows a power train of a vehicle having a controller and control system for preventing over-rotation of an engine. This power train is composed of engine 1 and automatic transmission 2. Engine 1 as shown is a gasoline engine. Throttle valve 3, as a means that determines the output of engine 1, is not mechanically connected to accelerator pedal 4 manipulated by the driver. Instead, it is cut off from the accelerator pedal, and the opening degree of throttle valve 3 is electronically controlled by means of throttle actuator 5.

Engine controller 6 has an engine control part and an over-rotation preventing part, an over-rotation prevention releasing part, an engine torque increasing rate regulating part and an upper limit velocity setting part. Throttle actuator 5 controls the operation quantity as the engine torque control part of engine controller 6 works corresponding to target throttle opening degree tTV0 determined as to be explained later corresponding to the operation of accelerator pedal 4 (driver requested torque). As a result, the opening degree of throttle valve 3 reaches in agreement with target throttle opening degree tTV0, and the output of engine 1 is controlled to a level corresponding to the operation of accelerator pedal 4. On the other hand, in order to control to reduce the throttle opening degree for preventing over-rotation of the engine by the over-rotation preventing part, control is also possible by means of factors other than the operation of the accelerator pedal 4.

Control by engine controller 6 (such as control of the engine torque, control of over-rotation, control for releasing the control for preventing over-rotation, control for regulating the torque increasing rate of the engine, etc.) is not limited to control of the opening degree of the throttle valve via throttle actuator 5. It also may be carried out by other means not shown in the figure, such as fuel-cutting control, ignition timing control, control of the valve lift distance of the intake/exhaust valves, etc.

Automatic gear-shifting device as shown is a well-known step-type automatic transmission 2. Corresponding to the combination of ON/OFF of shift solenoids 8-10 inserted in control valve body 7, automatic transmission 2 selects the corresponding gear position. Corresponding to the selected gear position, the rotation velocity of engine 1 is changed by the gear ratio, and power is transmitted to the driving wheels of the vehicle.

ON/OFF control of shift solenoids 8-10 is carried out as follows by means of transmission controller 11. Transmission controller 11 has a coupling pressure control and coupling pressure setup part. Also, transmission controller 11 has a selected range signal input to it from shift lever 12 manipulated by the driver to any desired range selected from parking (P) range, reverse (R) range, neutral (N) range, automatic transmission drive (D) range, engine brake (L) range and manual gear-shifting (M) range (manual gear-shifting mode). When automatic transmission 2 selects a range that prevents power transmission, all of shift solenoids 8-10 are turned OFF, so that automatic transmission 2 is set in the neutral state. On the other hand, when automatic transmission 2 selects a range where power is transmitted, shift solenoids 8-10 are turned ON/OFF so that automatic transmission 2 enters the transmission state corresponding to the selected range.

In the following, a brief explanation will be given regarding the operation when the automatic transmission drive (D) range or manual gear-shifting (M) range is selected.

First, when the automatic transmission drive (D) range is selected, transmission controller 11 determines the target gear position based on a prescribed gear position map from the vehicle running state (vehicle speed VSP, accelerator opening degree APO, etc., to be explained later), and shift solenoids 8-10 are turned ON/OFF such that gear-shifting is performed from the existing selected gear position to the target gear position.

On the other hand, when the manual gear-shifting (M) range is selected, if there is a manual upshift instruction or manual downshift instruction coming via shift lever 12, transmission controller 11 turns ON/OFF shift solenoids 8-10 so that the gear is shifted from the present gear position to one-step higher or lower than the gear position. Until the next manual upshift instruction or manual downshift instruction comes, shift solenoids 8-10 are kept at the current ON/OFF state, and the switched gear position is maintained.

Engine controller 6 and transmission controller 11 control engine 1 and automatic transmission 2, respectively. In addition, based on the input information, the computing results are mutually matched in communication so that engine 1 and automatic transmission 2 are controlled in step with each other.

For this purpose, as the common input information, the selected range signal, manual upshift instruction and manual downshift instruction are sent from shift lever 12 to engine controller 6 and transmission controller 11. In addition, the following signals are also input:

a) a signal from accelerator opening degree sensor 13 that detects the pressing distance (accelerator opening degree) AP0 of accelerator pedal 4;

b) a signal from input rotation sensor 14 that detects input rotation velocity Ni of automatic transmission 2;

c) a signal from engine rotation sensor 15 that detects engine rotating speed Ne;

d) a signal from output rotation sensor 16 that detects the output rotation velocity No of automatic transmission 2;

e) a signal from vehicle speed sensor 17 that detects vehicle speed VSP; and f) a signal from throttle opening degree sensor 18 that detects throttle opening degree TV0 of throttle valve 3.

Transmission controller 11 determines the preferable target gear position corresponding to the present driving state based on accelerator opening degree APO and vehicle speed VSP, or it determines the target gear position corresponding to the manual upshift instruction or manual downshift instruction and turns ON/OFF shift solenoids 8-10 so that gear-shifting is performed from the present selected gear position to the target gear position.

During the gear-shifting operation, the coupling pressure control part of transmission controller 11 also functions to control the coupling pressure of the friction elements on the coupling side and the friction elements on the release side via shift solenoids 8-10.

Figure 2A:
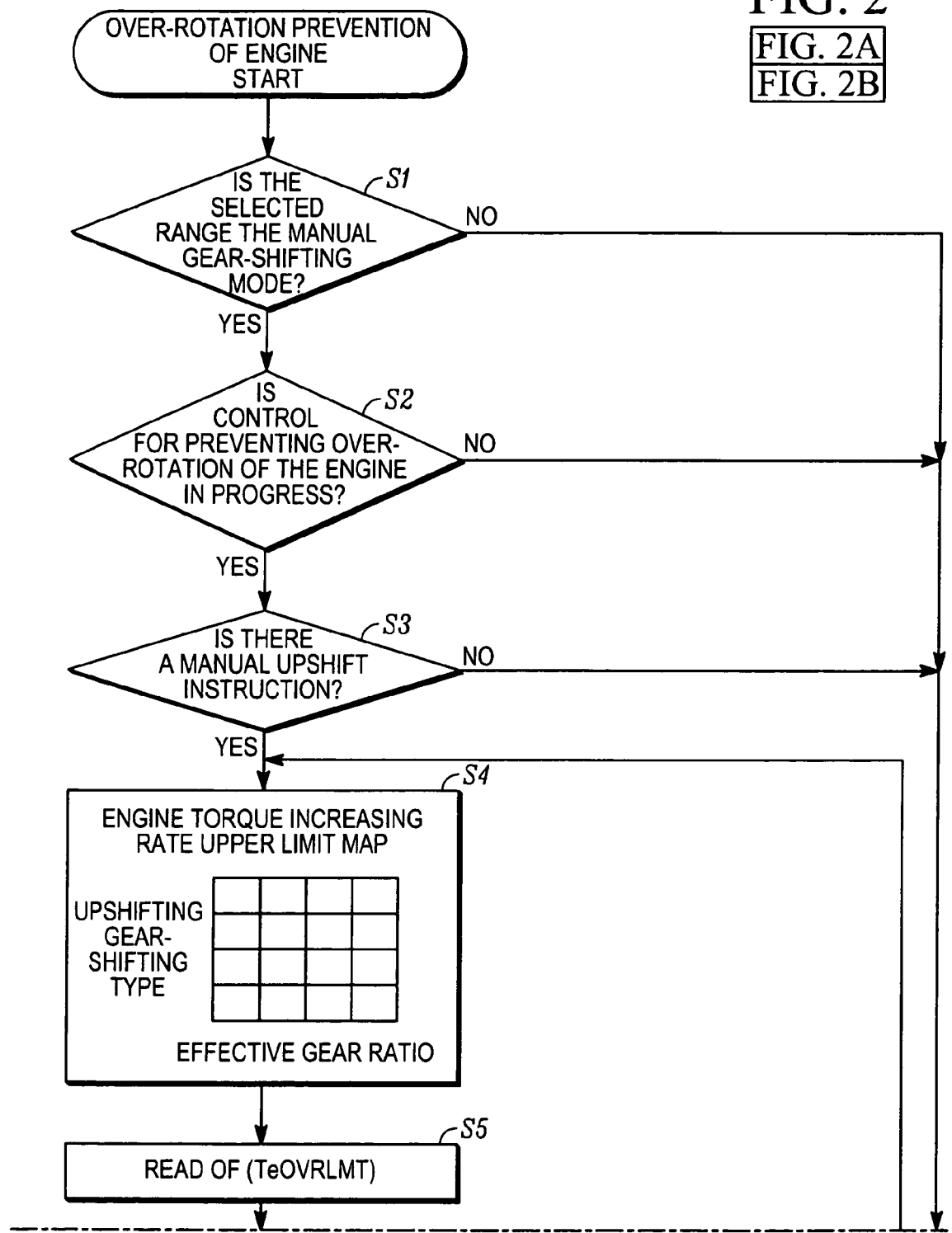
FIG. 2 includes FIGS. 2A and 2B, which include a flow chart illustrating one control program when the engine controller in the power train control system determines target engine torque for preventing over-rotation of engine and the coupling pressure of the friction elements on the coupling side.
Figure 2B:
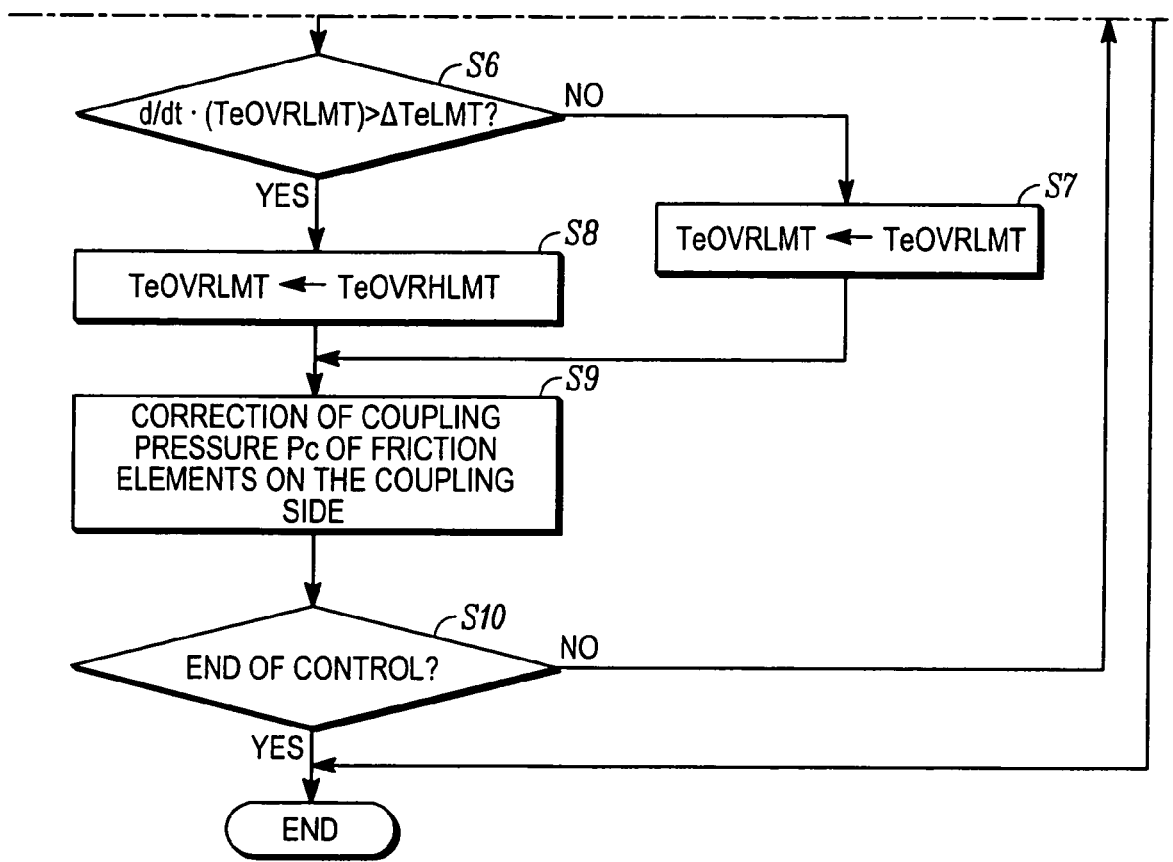

Engine controller 6 executes the control program shown in FIG. 2 (FIG. 2 includes FIGS. 2A and 2B) to determine target throttle opening degree tTV0 and to control to prevent over-rotation of the engine. In step S1 whether the selected range is the manual gear-shifting range is checked. In step S2 whether control for preventing over-rotation of engine is performed is checked. In step S3 whether there is a manual upshift instruction is checked.

If the range is not the manual gear-shifting range in step S1, or if the state is not set for control for preventing over-rotation in step S2, or if there is no manual upshift instruction in step S3, there is no need to perform the control program shown in FIG. 2 for preventing over-rotation, so the process comes to an end.

However, if the range is the manual gear-shifting range in step S1, the state is set for control for preventing over-rotation in step S2, and there is a manual upshift instruction in step S3, there is a need for over-rotation prevention. Consequently, the process advances to steps S4-S9. Control for preventing over-rotation of engine after manual upshifting is performed as follows.

Stored in memory of the engine controller 6 is a two-dimensional map of effective gear ratio i and the upshifting gear-shifting type (1→2, 2→3, 3→4, etc.) The map relates these combinations to the upper limit value ΔTeLMT pertaining to the engine torque increasing rate when control for preventing over-rotation is released for each of the combinations. Of course, this map could be stored in the form of a look-up table or otherwise. In step S4 the effective gear ratio i, which is represented by Ni/No, the ratio of the rotation velocity of the input shaft to that of the output shaft, and the upshifting gear-shifting type are used to read the upper limit value ΔTeLMT.

Next, in step S5 requested engine torque TeOVRLMT of the control for preventing over-rotation of the engine according to step S2 is read. As can be seen from the result of steps S1-S3, with reference to FIG. 3 (FIG. 3 includes FIGS. 3A and 3B) the requested engine torque TeOVRLMT of the control for preventing over-rotation of the engine read in step S5 corresponds to target engine torque tTe during the recovering rise from time t3' when control for preventing over-rotation is released as engine rotating speed Ne decreases at the start of upshifting. This start of upshifting corresponds to issuing of a manual upshift instruction at time t2 during the control for preventing over-rotation of the engine that has been performed since time t1.

Figures 3, 3A, 3B:
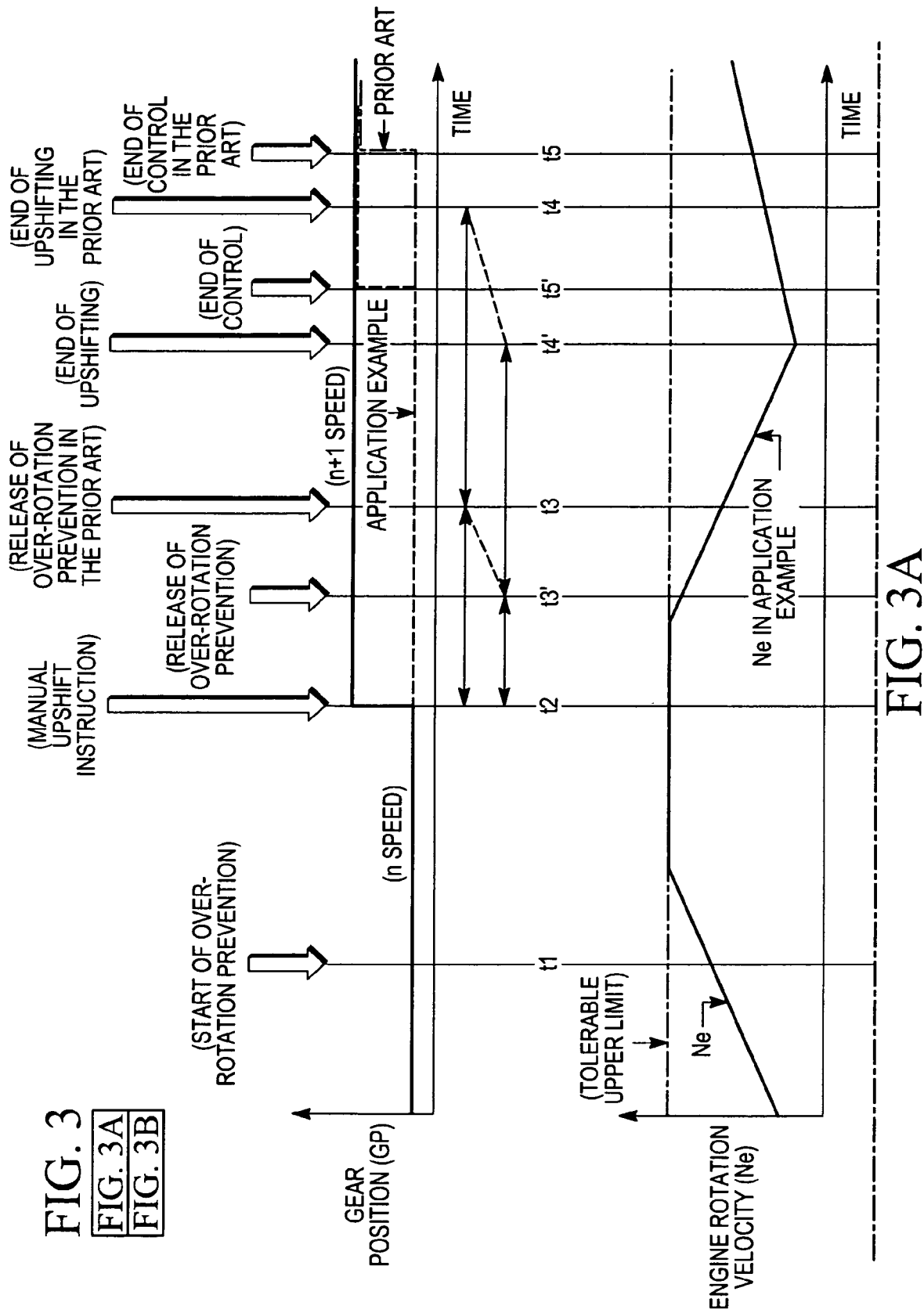
FIG. 3 includes FIGS. 3A and 3B, which show a time chart for execution of the control program shown in FIG. 2.
Figure 3B:
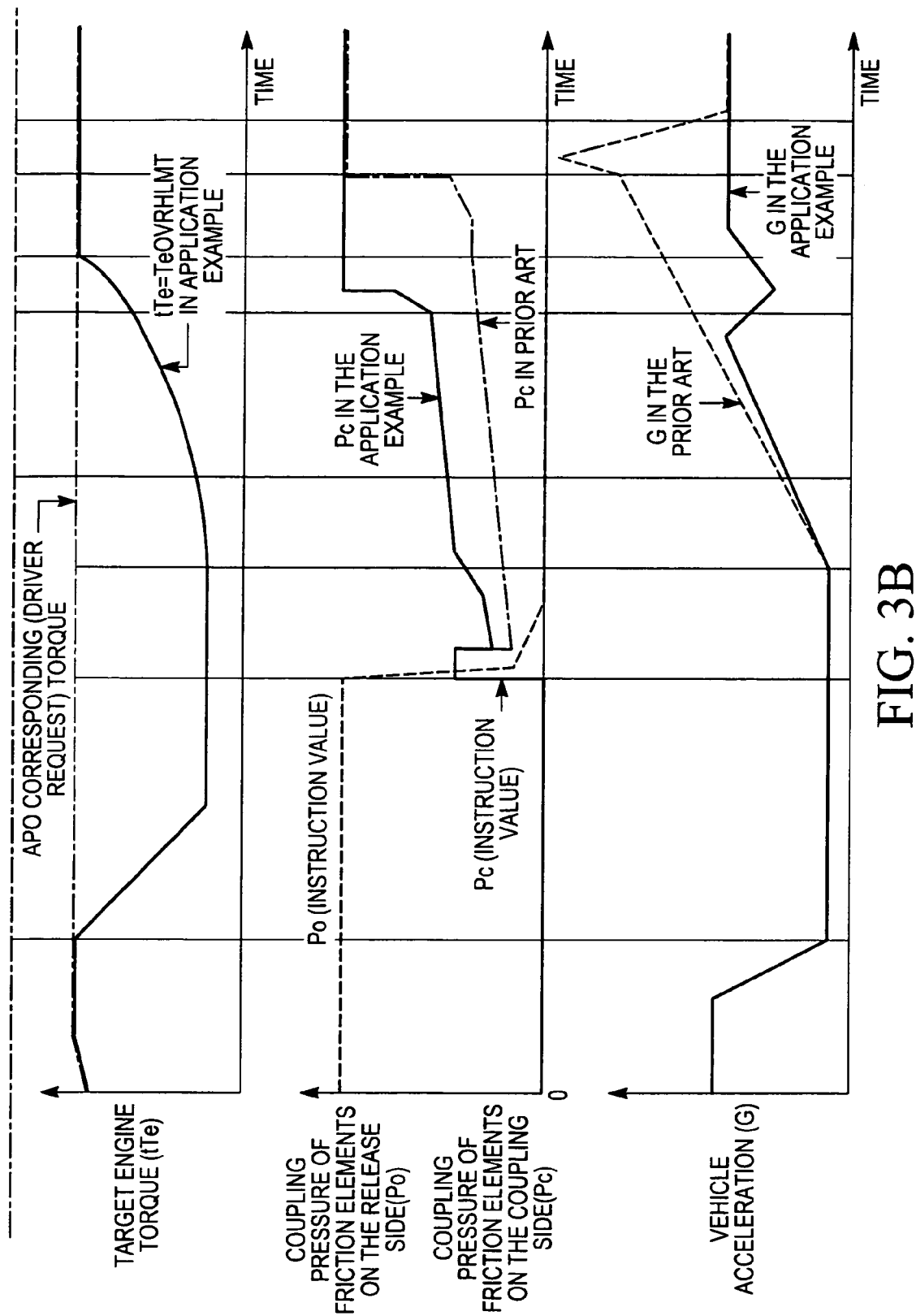

Returning now to FIG. 2B, in step S6 the change speed of requested engine torque TeOVRLMT of the control for preventing over-rotation of the engine read in step S5, that is, increasing rate d/dt·(TeOVRLMT) of the engine torque after time t3' when control for preventing over-rotation shown in FIG. 3 is released, is computed. Then, whether increasing rate d/dt·(TeOVRLMT) is faster than increasing rate upper limit value ΔTeLMT at the time the control for preventing over-rotation read in step S4 is released is checked.

If increasing rate d/dt·(TeOVRLMT) is not faster, in step S7 requested engine torque TeOVRLMT of the control for preventing over-rotation of the engine read in step S5 by the upper limit setup part is directly taken as requested engine torque TeOVRLMT at the time of release of the control for preventing over-rotation. The requested engine torque TeOVRLMT at the time of release of the control for preventing over-rotation determined in this way is taken as target engine torque tTe after time t3' of release of the control for preventing over-rotation as shown in FIG. 3.

Engine controller 6 outputs the targeted throttle opening degree tTV0 used for realizing targeted engine torque tTe=TeOVRLMT based on the current engine rotation speed Ne to throttle actuator 5 so that throttle opening degree TVO matches the targeted throttle opening degree tTV0. In this way, targeted engine torque tTe=TeOVRLMT can be realized.

Returning again to FIG. 2B, in step S6 if increasing rate d/dt·(TeOVRLMT) of the engine torque after time t3' of release of the control for preventing over-rotation as shown in FIG. 3B is higher than increasing rate upper limit value ΔTeLMT of the engine torque at the time of release of the control for preventing over-rotation, processing advances to step S8 instead of step S7.

In step S8 requested engine torque TeOVRHLMT at the time of release of the control for preventing over-rotation that has been limited is computed so that increasing rate d/dt·(TeOVRLMT) of the engine torque is limited to the increasing rate upper limit value ΔTeLMT of the engine torque at the time of release of the control for preventing over-rotation. Requested engine torque TeOVRHLMT is then set as requested engine torque TeOVRLMT at the time of release of the control for preventing over-rotation.

Hence, requested engine torque TeOVRLMT=TeOVRHLMT at the time of release of the control for preventing over-rotation determined as discussed above is taken as target engine torque tTe after time t3' when the control for preventing over-rotation is released as shown in FIG. 3A.

When engine controller 6 outputs target throttle opening degree tTV0 for realizing target engine torque tTe=TeOVRHLMT based on the present engine rotating speed Ne to throttle actuator 5, throttle opening degree tTV0 is set in agreement with target throttle opening degree tV0, so that target engine torque tTe=TeOVRHLMT can be realized. That is, in the regulation of the increasing rate, the torque instruction value of the engine is computed, and the throttle opening degree is controlled to correspond to the torque instruction value so that the speed in opening the throttle valve is lower than that in the case corresponding to the conventional operation of an accelerator pedal.

Whether TeOVRLMT is set according to step S7 or step S8, in step S9 the coupling pressure setup part corrects coupling pressure Pc of the friction elements on the coupling side after time t3' of release of the control for preventing over-rotation as shown in FIG. 3 to the value at the time of release of the control for preventing over-rotation. Or, the coupling pressure setup part replaces coupling pressure Pc with a value read from the dedicated map at the time of release of the control for preventing over-rotation.

When this correction or replacement is performed, coupling pressure Pc of the friction elements on the coupling side after time t3' of release of the control for preventing over-rotation comes into correspondence with engine torque Te, throttle opening degree TVO and accelerator opening degree AP0. This coupling pressure Pc is indicated by the solid line after time t3' of release of the control for preventing over-rotation as shown in FIG. 3B, and it is higher than the proportion with respect to the conventional engine torque.

Returning once again to FIG. 2, the control for preventing over-rotation in steps S4-S9 is executed continuously until it is determined that the control should be terminated in response to the query of step S10. Whether the control should be terminated can be judged by determining that a margin of time has passed after completion of gear-shifting when the effective gear ratio represented by the ratio of the rotation velocity of the input shaft to that of the output shaft Ni/No becomes the gear ratio after gear-shifting.

In this described application example, during control for preventing over-rotation of the engine as shown in FIG. 3, manual upshifting is performed (at time t2). In conjunction with this, due to a decrease in engine rotating speed Ne control for preventing over-rotation is released, and the opening degree of the throttle valve rises to recover (after t3'). At this time, the increasing rate of target engine torque tTe is suppressed and limited to increasing rate ΔTeLMT of the engine torque when control for preventing over-rotation is released in steps S6 and S8, and target engine torque tTe after time t3' of release of the control for preventing over-rotation is taken as requested engine torque TeOVRHLMT at the time of release of the control for preventing over-rotation that has been limited.

As a result, it is possible to relax the steep increase recovery of the engine torque in the increase recovery of the opening degree of the throttle valve corresponding to release of the control for preventing over-rotation with respect to rise of coupling pressure Pc of the friction elements on the coupling side that performs manual upshifting.

Also, it is possible to relax the delay of rise in coupling pressure Pc of the friction elements on the coupling side with respect to the increase recovery of the engine torque, and it is possible to reduce a flare phenomenon in conjunction with the instability indicated by a wavy line of engine rotating speed Ne as seen in known devices, and it is possible to smoothly change engine rotating speed Ne as indicated by the solid line in FIG. 3A.

Consequently, as shown in FIG. 3 time t3' of release of the control for preventing over-rotation comes before time t3 for release of the control for preventing over-rotation in the known art. At the same time, time t4' at the completion of gear-shifting as the effective gear ratio represented by the ratio i of the rotation velocity of the input shaft to that of the output shaft Ni/No reaches the gear ratio after gear-shifting comes before time t4 at the completion of gear-shifting in the known art.

It is thus possible to avoid a longer gear-shifting time of manual upshifting during control for preventing over-rotation, and it is possible to suppress delay in the response of gear-shifting.

With the same reasoning, for coupling pressure Pc of the friction elements on the coupling side, there is no sudden change, which has formerly led to a change in the time sequence of vehicle acceleration G indicated by the wavy line in FIG. 3B, so that gear-shifting shock of sudden change in the manual upshifting in the known art can be suppressed. Now, since a sudden change in coupling pressure Pc does not take place vehicle acceleration G undergoes the time sequential change indicated by the solid line shown in FIG. 3B, and it is possible to suppress the gear-shifting shock of sudden change of the manual upshifting.

In step S9 shown in FIG. 2B, after time t3' of release of the control for preventing over-rotation shown in FIG. 3B, coupling pressure Pc of the friction elements on the coupling side is shown by the solid line. It can be seen that during the period when control for preventing over-rotation is not performed, the proportion with respect to the engine torque of coupling pressure Pc in the normal case is increased, and it is higher than coupling pressure Pc in the known art indicated by the wavy line. Consequently, the response to gear-shifting can be improved for the following reason.

That is, because the engine torque falls during the operation in preventing over-rotation, right after time t2 when the manual upshift instruction comes, coupling is performed for the friction elements on the coupling side under low coupling pressure Pc corresponding to the low engine torque. Hence there is a tendency due to progress in the manual upshifting for the time (torque phase time) from time t2 when the manual upshift instruction comes to time t3' when engine rotating speed Ne falls due to progress of the manual upshifting to be increased. On the other hand, in this application example, as explained above coupling pressure Pc is proportionally increased with respect to the engine torque, so that coupling of the friction elements on the coupling side can be performed quicker, and the torque phase time can be shortened.

Also, for the increasing rate of target engine torque tTe suppressed after time t3' when control for preventing over-rotation is released, coupling pressure Pc determined corresponding to the engine torque is also decreased, and there is a tendency for the time (initial phase time) from time t3' when decrease of engine rotating speed Ne falls due to progress of the manual upshifting to time t4' at the end of gear-shifting to be increased. However, as explained above, when the proportion of coupling pressure Pc with respect to the engine torque becomes larger than that in the known art, coupling of the friction elements on the coupling side is performed quickly, and the initial phase time can be shortened.

As explained above, when the proportion of coupling pressure Pc after time t3' of release of the control for preventing over-rotation with respect to the engine torque is higher than that in the normal case, it is possible to shorten both the torque phase time and the initial phase time, and it is possible to suppress the increasing rate of target engine torque tTe after time t3' of release of the control for preventing over-rotation. Consequently, although there is a tendency for coupling pressure Pc to fall since it is determined according to the engine torque, there is still no decrease in the gear-shifting response. Instead, it is improved.

Figures 4, 4A, 4B:
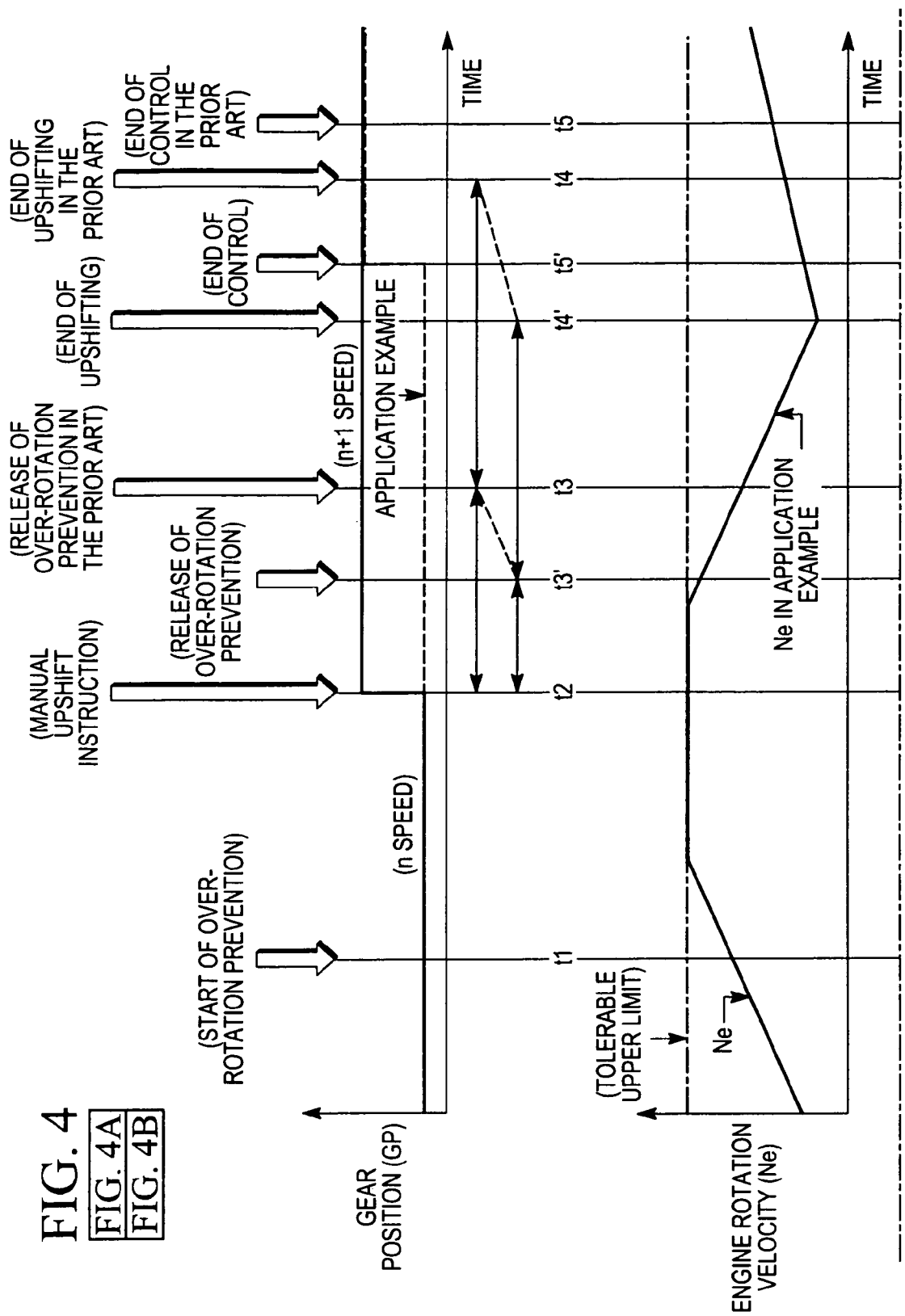
FIG. 4 includes FIGS. 4A and 4B, which show a time chart similar to that shown in FIG. 3 that illustrates another application example.
Figure 4B:
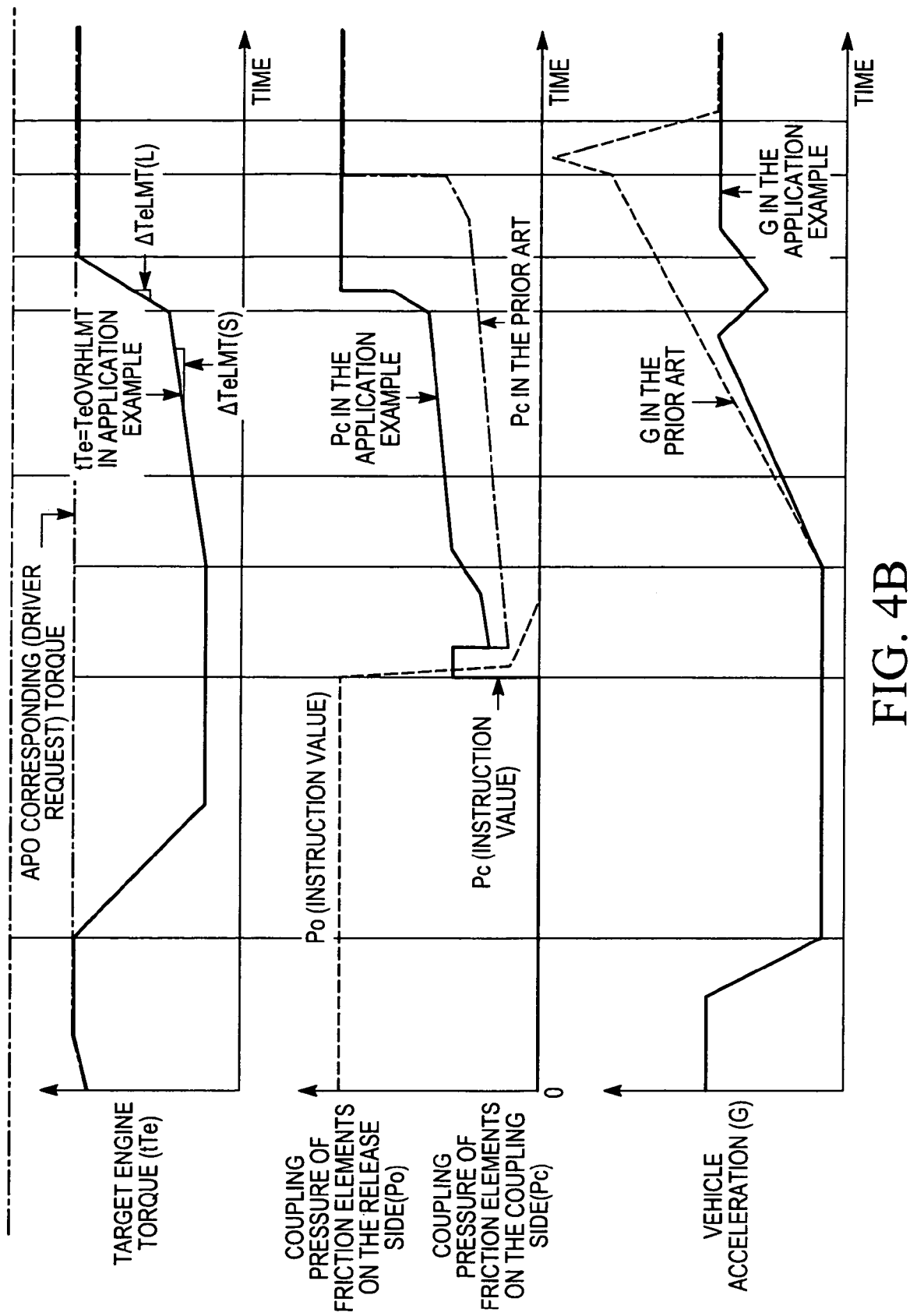

In addition, increasing rate upper limit value ΔTeLMT of the engine torque determined in step S4 shown in FIG. 2A can be different before and after the time effective gear ratio i reaches the prescribed gear ratio. In other words, one has increasing rate upper limit value ΔTeLMT around the time of completion of gear-shifting by the automatic transmission. In this case, the prescribed gear ratio is taken as the gear ratio after the manual upshifting, and, as shown in FIG. 4 (FIG. 4 includes FIGS. 4A and 4B), increasing rate upper limit value ΔTeLMT of the engine torque is different before and after time t4' of completion of actual gear-shifting. As indicated by the fact that the increasing rate upper limit value of the engine torque after actual gear-shifting completion time t4' is ΔTeLMT=ΔTeLMT(L), it can be larger than increasing rate upper limit value ΔTeLMT =ΔTeLMT(S) of the engine torque before actual gear-shifting completion time t4'.

In this way, when increasing rate upper limit value ΔTeLMT of the engine torque is determined, increasing rate upper limit value ΔTeLMT=ΔTeLMT(S) of the engine torque before actual gear-shifting completion time t4' (during gear-shifting) is set at the increasing rate of the engine torque that is appropriate and free of excess or insufficiency in realizing the operation and effect of the these embodiments of the invention. Also, increasing rate upper limit value ΔTeLMT=ΔTeLMT(L) of the engine torque after actual gear-shifting completion time t4' irrelevant to this operation and effect is set at a rate such that control is completed as soon as possible until control completion time t5'.

As a result, the operation and effect of embodiments of the invention can be realized, the control for preventing over-rotation can be finished as quickly as possible, and undesired extension of the control time can be avoided.

Figure 5B:
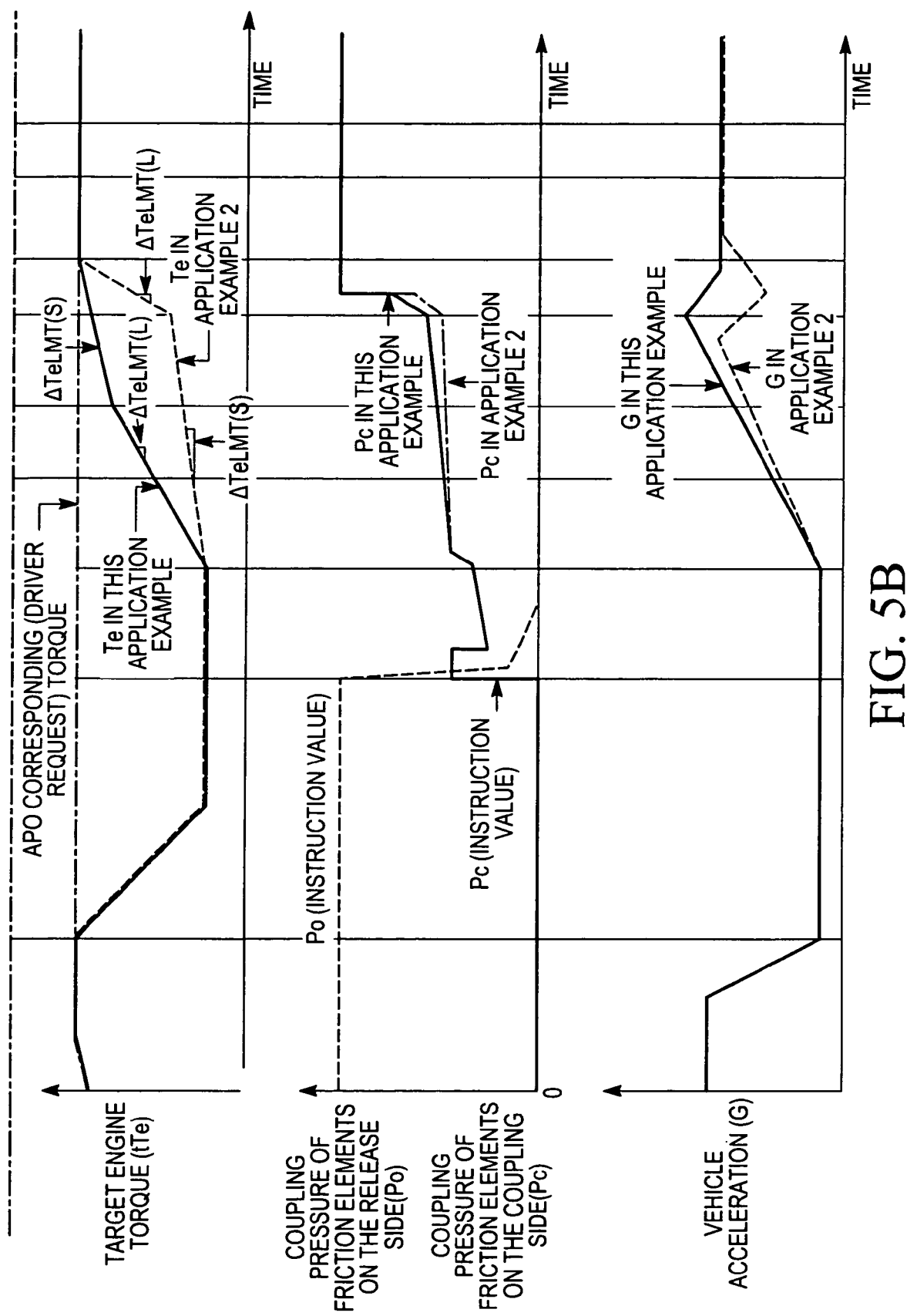
FIG. 5 includes FIGS. 5A and 5B, which show a time chart similar to that shown in FIG. 4 that illustrates yet another application example.

In addition, for increasing rate upper limit value ΔTeLMT of the engine torque determined in step S4 shown in FIG. 2A, the effective gear ratio i of the transmission can be made different before and after the time the gear ratio that is set different corresponding to different gear positions in manual upshifting is reached. That is, it is possible to set increasing rate upper limit value ΔTeLMT corresponding to the gear ratio after completion of gear-shifting of the automatic transmission. In this case, the prescribed gear ratio is taken as the gear ratio that is nearer to the gear ratio before gear-shifting than the gear ratio after gear-shifting by manual upshifting, and, as shown in FIG. 5 (FIG. 5 includes FIGS. 5A and 5B), increasing rate upper limit value ΔTeLMT of the engine torque is different before (former period of gear-shifting) and after (latter period of gear-shifting) time t4" when effective gear ratio i becomes the set gear ratio. As indicated by the fact that the increasing rate upper limit value of the engine torque in the former period of gear-shifting is ΔTeLMT =ΔTeLMT (L), it can be larger than increasing rate upper limit value ΔTeLMT=ΔTeLMT(S) of the engine torque in the latter period of gear-shifting.

When increasing rate upper limit value ΔTeLMT of the engine torque is determined in this way, it is possible for target engine torque tTe to be in the initial phase from time t3' to t4' when effective gear ratio i becomes the gear ratio after a gear-shifting larger than the target engine torque.

As a result, vehicle acceleration G in this third application example can be higher than that indicated by the wavy line in the second application example shown in FIG. 4B. While in the second application example shown in FIG. 4B the vehicle acceleration G is discontinuous when it falls to the acceleration after gear-shifting once it falls as indicated by the wavy line, in the present application example there is no fall-in of vehicle acceleration G, it can settle at the acceleration after gear-shifting, and there is a feeling of continuity in the acceleration.

In step S9 shown in FIG. 2B, the gear-shifting response is improved by increasing the proportion of coupling pressure Pc of the friction elements on the coupling side after time t3' of release of the control for preventing over-rotation as explained above with respect to FIG. 3B with respect to the engine torque. In this way, when coupling pressure Pc after t3' of release of the control for preventing over-rotation is increased above that in the normal state, as indicated by the input signal in step S9 shown in FIG. 2B, it is possible to actually realize an increase in coupling pressure Pc by virtually changing the control factors that determine the coupling pressure Pc, such as engine torque Te, throttle opening degree TVO and accelerator opening degree AP0. This has been explained in the above.

Figure 6A:
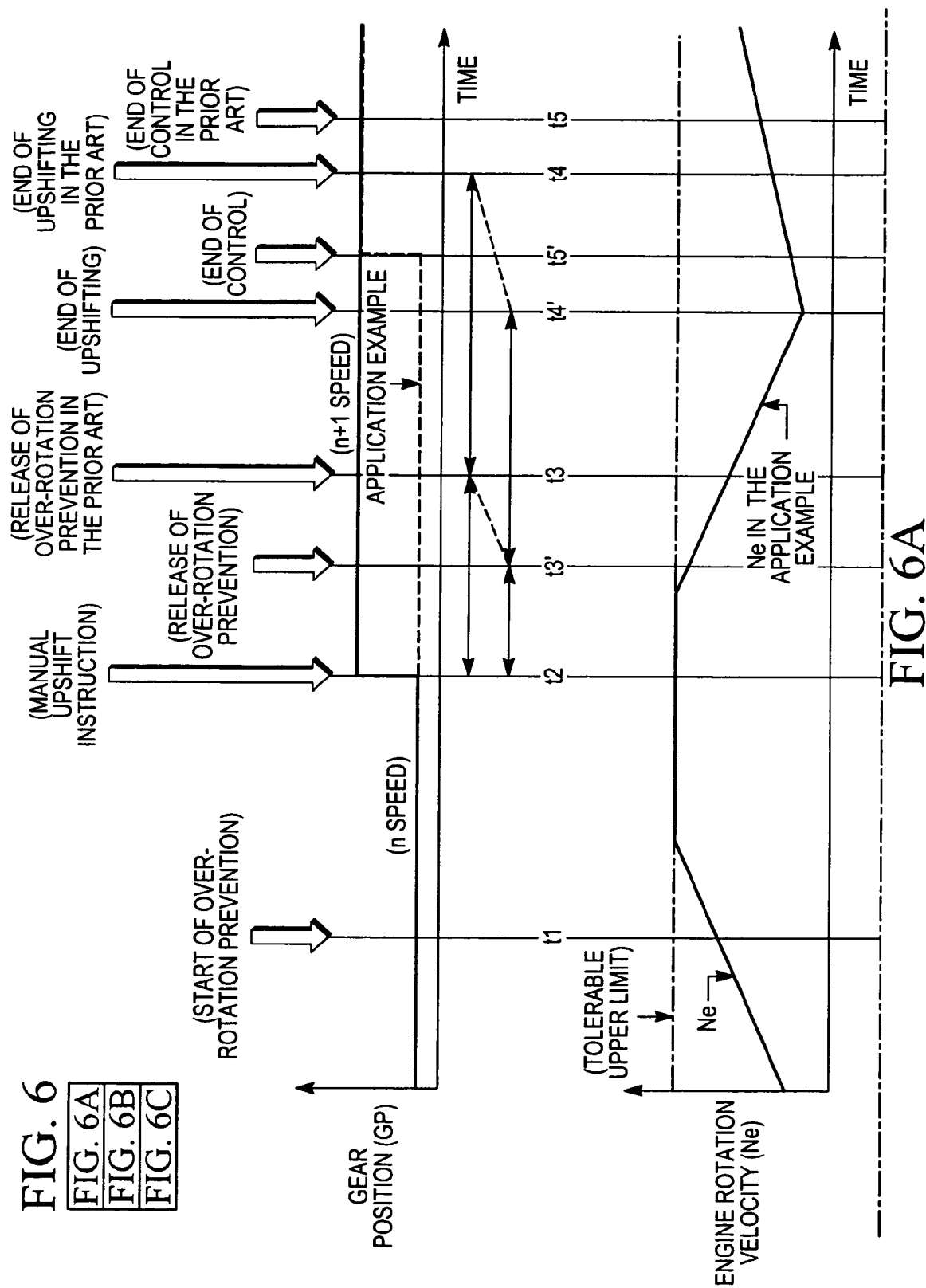
FIG. 6 includes FIGS. 6A, 6B and 6C, which show a time chart similar to that shown in FIG. 4 that illustrates yet another application example.
Figure 6B:
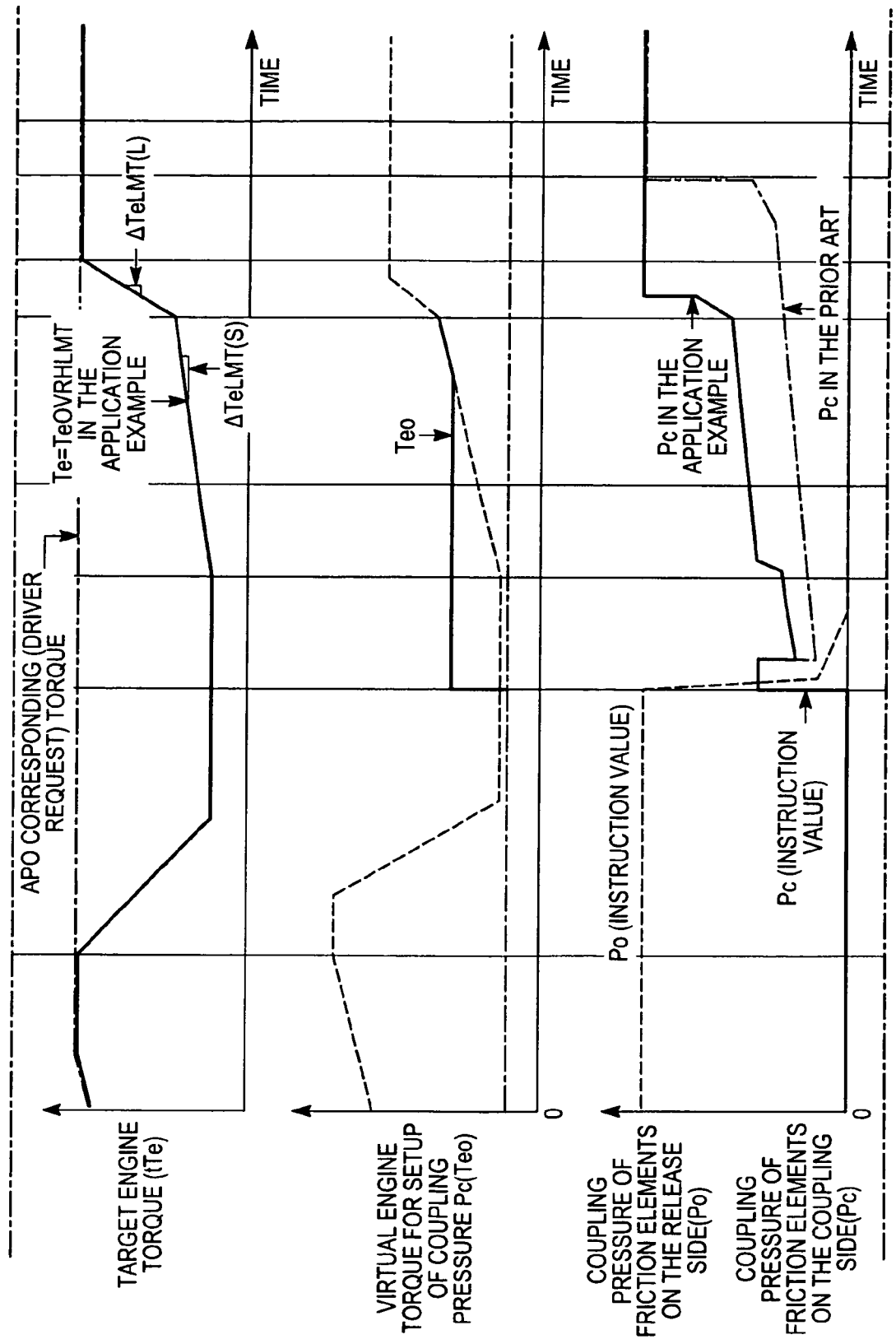
Figure 6C:
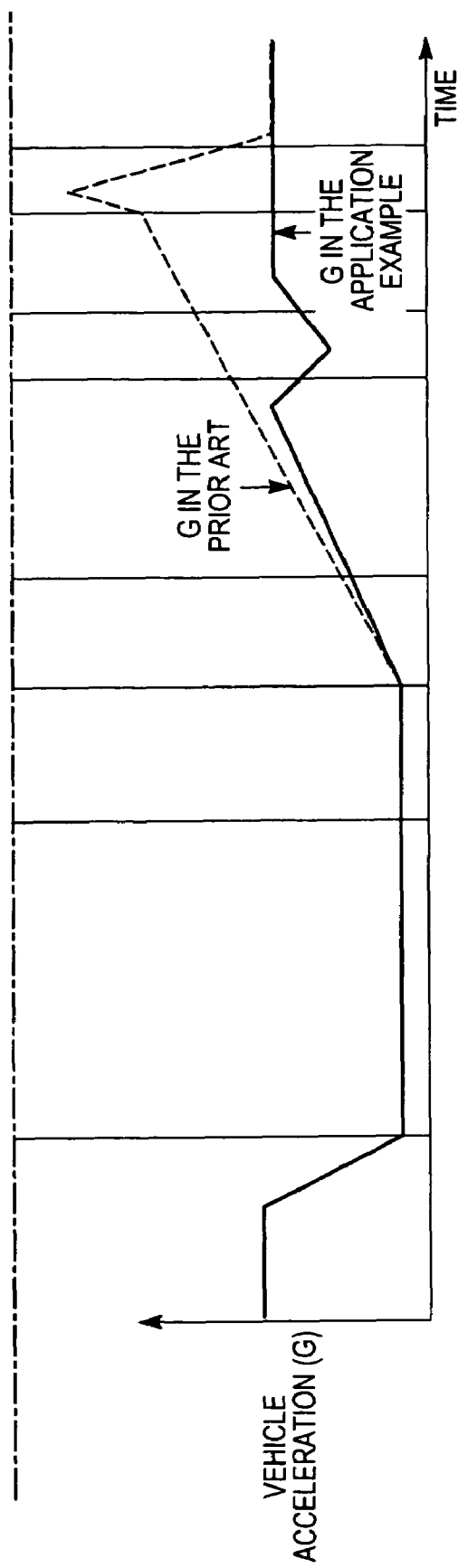

In the following, an explanation will be given in more detail regarding the case of realization of rise of coupling pressure Pc as the engine torque is virtually changed with reference to FIG. 6 (FIG. 6 includes FIGS. 6A, 6B and 6C).

FIG. 6 shows a time chart illustrating the case when rise in the coupling pressure Pc is realized by virtually changing the engine torque shown in FIG. 4 when the proportion of coupling pressure Pc indicated by the solid line in that figure with respect to the engine torque is increased above that in the normal state. When control for preventing over-rotation is not performed, engine torque Teo used in determining coupling pressure Pc is usually indicated by a wavy line. After time t2 when a manual upshift instruction comes, as indicated by the solid line, engine torque Teo for determining the coupling pressure virtually rises to the prescribed level at the time of release of the control for preventing over-rotation. After the time it reaches agreement with engine torque Teo for determining the coupling pressure indicated by the wavy line determined as in the normal state, engine torque Teo for determining the coupling pressure is switched to a level for the normal state and higher than the prescribed value at the time of release of the control for preventing over-rotation.

In this way, based on virtual engine torque Teo for determining the coupling pressure, the target value of coupling pressure Pc is determined. By controlling coupling pressure Pc to this target value, coupling pressure Pc indicated by the solid line in FIG. 6B can be increased above the proportion with respect to the engine torque of the normal value indicated by the wavy line.

In these application examples, an explanation was provided for the case when feedback control is performed for the target torque of the engine so that the engine rotation velocity is kept constant in the control for preventing over-rotation. However, the over-rotation preventing device of the engine taught herein may also be adopted in a case in which instead of keeping the engine rotation velocity constant, when the engine rotation velocity is over a prescribed level the target torque of the engine is suppressed so as to lower the engine rotation velocity. Also in these examples, an explanation was provided for the case in which the over-rotation preventing device works in the manual mode of the automatic transmission. However, the over-rotation prevention device may also be adopted in the automatic gear-shifting mode. In addition, an explanation was provided for the case when an automatic transmission having gear position steps is used. However, the over-rotation preventing device taught herein may also be adopted in a step-less automatic transmission (CVT, etc.).

What is claimed is:

1. A device for preventing over-rotation of an engine with an automatic transmission, comprising:
   a rotation velocity sensor for detecting a rotation velocity of the engine; and
   a controller receiving input from the rotation velocity sensor, the controller including:
      an engine torque control part operable to control a torque of the engine based on a driver request for driving force;
      an over-rotation preventing part operable to suppress the torque controlled by the engine torque control part based on the rotation velocity and to prevent over-rotation of the engine;
      an over-rotation prevention releasing part operable to release suppression of the torque by the over-rotation preventing part based on the rotation velocity lowered due to upshifting of the automatic transmission; and
      an engine torque increasing rate regulating part operable to regulate an increasing rate of the torque when the suppression of the torque is released and the torque is increased due to the over-rotation prevention releasing part.

2. The device according to claim 1 wherein the engine torque increasing rate regulating part comprises different degrees of suppression of the torque before and after completion of gear-shifting by the automatic transmission.

3. The device according to claim 2 wherein the different degrees of suppression are based on each gear ratio of the automatic transmission after completion of gear-shifting.

4. The device according to claim 1 wherein the engine torque increasing rate regulating part comprises different degrees of suppression of the torque corresponding to each gear ratio after completion of gear-shifting by the automatic transmission.

5. The device according to claim 1, wherein the automatic transmission further includes friction elements for gear-shifting and wherein the controller further includes:
   a coupling pressure control part operable to control a coupling state and a released state of the friction elements by means of a coupling pressure; and
   a coupling pressure setup part operable to set the coupling pressure based on the torque wherein the coupling pressure setup part sets the coupling pressure to prevent over rotation of the engine by the over-rotation preventing part and to regulate the increasing rate of the torque by the engine torque increasing rate regulation part higher than that when the control for preventing over rotation is not performed by the over rotation preventing part and the control for regulating the increasing rate is not performed by the engine torque increasing rate regulating part.

6. The device according to claim 5 wherein the torque suppressed by the over-rotation preventing part is a suppressed torque and wherein the coupling pressure setup part is further operable to set the coupling pressure based on the torque obtained by increasing and correcting the suppressed torque.

7. In an over-rotation preventing device for preventing over-rotation of an engine with an automatic transmission, the improvement comprising:
   means for decreasing a rotation velocity of the engine during control for preventing over-rotation of the engine with engine torque suppressed;
   means for releasing the control for preventing over-rotation when the rotation velocity of the engine falls with gear-shifting by the automatic transmission;
   means for increasing the engine torque after the control for preventing over-rotation is released; and
   means for suppressing an engine torque increase recovery rate when the engine torque increases.

8. The over-rotation preventing device according to claim 7 wherein the means for suppressing the engine torque increase recovery rate further comprises:
   a suppressing degree of the engine torque increase recovery rate different before and after completion of gear-shifting.

9. The over-rotation preventing device according to claim 7 wherein the means for suppressing the engine torque increase recovery rate further comprises:
   a suppressing degree of the engine torque increase recovery rate different for each gear ratio after completion of gear-shifting.

10. The over-rotation preventing device according to claim 7, further comprising:
    friction elements of the automatic transmission for gear-shifting;
    means for controlling a coupling state and a released state of the friction elements by means of coupling pressure; and
    means for setting the coupling pressure based on the engine torque wherein the setting means sets the coupling pressure during control for preventing over rotation of the engine by the decreasing means and control for increasing of the engine torque by the suppressing means higher than that when the control for preventing over rotation is not performed and control for increasing the engine torque is not performed.

11. The over-rotation preventing device according to claim 10 wherein the means for suppressing the engine torque increase recovery rate further comprises means for suppressing the engine torque to a suppressed engine torque; and wherein the setting means is further operable to set the coupling pressure by increasing and correcting the suppressed engine torque.

12. The over-rotation preventing device according to claim 10 wherein the means for suppressing the engine torque increase recovery rate further comprises:
    a first suppressing degree of the engine torque increase recovery rate before completion of gear-shifting; and
    a second suppressing degree of the engine torque increase recovery rate after completion of gear-shifting.

13. A method for preventing over-rotation of an engine that drives the driving wheels via an automatic transmission, the method comprising:
    controlling a torque of the engine based on a request by a driver for driving force;
    detecting a rotation velocity of the engine;
    suppressing the torque based on the rotation velocity;
    releasing suppression of the torque when the rotation velocity of the engine is lower than a prescribed level by gear-shifting the automatic transmission; and
    regulating an increasing rate of the torque when suppression of the torque is released and the torque is increased.

14. The method according to claim 13 wherein regulating the increasing rate of the torque when suppression of the torque is released and the torque is increased further comprises:
    regulating the increasing rate of the torque to a first increasing rate before completion of the gear-shifting; and
    regulating the increasing rate of the torque to a second increasing rate after completion of the gear-shifting.

15. The method according to claim 14 wherein the automatic transmission includes friction elements for gear-shifting, the method further comprising:
    controlling a coupling state and a released state of the friction elements by means of a coupling pressure;
    setting the coupling pressure based on the torque to a first coupling pressure during control for preventing over-rotation and control for regulating the increasing rate of the torque; and
    setting the coupling pressure based on the torque to a second, lower coupling pressure when the control for preventing over-rotation is not performed and the control for regulation the increasing of the torque is not performed.

16. The method according to claim 15 wherein suppressing the torque based on the rotation velocity comprises suppressing the torque to a suppressed torque, the method further comprising:
    setting the coupling pressure based on the torque obtained by increasing and correcting the suppressed torque.

17. The method according to claim 14 wherein regulating the increasing rate of the torque when suppression of the torque is released and the torque is increased further comprises:
    regulating the increasing rate of the torque to a rate different for each gear ratio after completion of gear-shifting.

18. The method according to claim 13 wherein regulating the increasing rate of the torque when suppression of the torque is released and the torque is increased further comprises:
    regulating the increasing rate of the torque to a rate different for each gear ratio after completion of gear-shifting.

* * * * *